US012603786B2

(12) United States Patent
Rastikian et al.

(10) Patent No.: US 12,603,786 B2
(45) Date of Patent: Apr. 14, 2026

(54) SECURE DIGITAL SIGNATURE SCHEMES

(71) Applicant: International Business Machines Corporation, Armonk, NY (US)

(72) Inventors: Simon Rastikian, Adliswil (CH); Bertram Poettering, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 18/755,542

(22) Filed: Jun. 26, 2024

(65) Prior Publication Data

US 2026/0005870 A1     Jan. 1, 2026

(51) Int. Cl.
| *H04L 29/06* | (2006.01) |
| *H04L 9/30* | (2006.01) |
| *H04L 9/32* | (2006.01) |

(52) U.S. Cl.
CPC .......... *H04L 9/3247* (2013.01); *H04L 9/3066* (2013.01)

(58) Field of Classification Search
CPC ............................ H04L 9/3247; H04L 9/3066
See application file for complete search history.

(56) References Cited

U.S. PATENT DOCUMENTS

| 9,973,342 B2 * | 5/2018 | Lyubashevsky | ...... H04L 9/3221 |
| 10,592,685 B2 * | 3/2020 | Yeo | ...................... H04L 9/0631 |
| 2011/0066910 A1 * | 3/2011 | Bandholz | .............. H04L 9/3236 |
| | | | 713/150 |

| 2013/0259226 A1 * | 10/2013 | Ciet | ......................... H04L 9/08 |
| | | | 380/44 |
| 2019/0229929 A1 * | 7/2019 | Camenisch | ........... H04L 9/3257 |
| 2020/0112424 A1 | 4/2020 | Gouget | |

FOREIGN PATENT DOCUMENTS

| CN | 1466839 A | * | 1/2004 | ........... H04N 7/1675 |
| CN | 1698111 A | * | 11/2005 | ....... G11B 20/00304 |
| CN | 1700634 A | * | 11/2005 | ........... H04L 9/3239 |
| CN | 116249982 A | * | 6/2023 | ........... G06F 21/602 |
| CN | 118540068 A | * | 8/2024 | ........... H04L 9/0838 |

(Continued)

OTHER PUBLICATIONS

Fabrice et al., "On the (in)Security of ROS", Journal of Cryptology, Oct. 1, 2022, 25 pages, vol. 35, No. 4 doi: https://doi.org/10.1007/500145-022-09436-0.

(Continued)

*Primary Examiner* — Sher A Khan

(74) *Attorney, Agent, or Firm* — Zilka-Kotab, P.C.

(57)     ABSTRACT

A computer-implemented method, according to one approach, includes: computing a first cryptographic term in response to receiving a session request from a user. The first cryptographic term is split into an initial portion and a remainder portion, where the remainder portion includes at least one bit. The initial portion of the first cryptographic term is sent to the user, and two or more different potential second cryptographic terms are received from the user. The at least one bit in the remainder portion is used to determine a correct one of the potential second cryptographic terms. Moreover, the correct one of the potential second cryptographic terms is used to compute a third cryptographic term. Furthermore, the third cryptographic term is sent to the user.

23 Claims, 8 Drawing Sheets

(56)                References Cited

FOREIGN PATENT DOCUMENTS

| CN | 119111059 | A | * | 12/2024 | .......... | H04L 9/3242 |
| IN | 202311052291 | A | | 9/2023 | | |
| WO | WO-2009090750 | A1 | * | 7/2009 | .......... | H04L 9/3073 |

OTHER PUBLICATIONS

Fuchsbauer et al., "Blind Schnorr Signatures and Signed ElGamal Encryption in the Algebraic Group Model", Advances in Cryptology—Eurocrypt 2020: 39th Annual International Conference on the Theory and Applications of Cryptographic Techniques, Zagreb, Croatia, May 10-14, 2020, Proceedings, Part II, 10 May 2020, pp. 63-95, doi: https://doi.org/10.1007/978-3-030-45724-2_3.

International Searching Authority, "Notification of Transmittal of the International Search Report and the Written Opinion of the International Searching Authority, or Declaration," Patent Cooperation Treaty, Sep. 8, 2025, 12 pages, International Application No. PCT/I82025/055630.

Rahul et al., India Application No. 202311052291A, filed Mar. 8, 2023, 27 pages.

Tsantikidou et al., "Threats, Attacks, and Cryptography Frameworks of Cybersecurity in Critical Infrastructures," Cryptography, vol. 08, 2024, pp. 1-24.

Benhamouda et al., "Publicly verifiable anonymous tokens with private metadata bit," Cryptology ePrint Archive, 2022, 33 pages, retrieved from https://eprint.iacr.org/2022/004.

Fuchsbauer et al., "Concurrently Secure Blind Schnorr Signatures," Cryptology ePrint Archive, 2024, 47 pages, retrieved from https://eprint.iacr.org/2022/1676.

Benhamouda et al., "On the (in)security of ROS," Cryptology ePrint Archive, 2020, 20 pages, retrieved from https://eprint.iacr.org/2020/945.

Tessaro et al., "Short Pairing-Free Blind Signatures with Exponential Security," Cryptology ePrint Archive, 2022, 54 pages, retrieved from https://eprint.iacr.org/2022/047.

Pointcheval et al., "Security Arguments for Digital Signatures and Blind Signatures," Journal of Cryptology, vol. 13, No. 3, 2000, pp. 361-396.

Microsoft, "U-Prove," Microsoft Research, 2024, 3 pages, retrieved from https://www.microsoft.com/en-us/research/project/u-prove/.

* cited by examiner

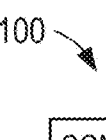

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

IMPROVED DIGITAL SIGNATURE CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

Form a collection of cryptographic digital signature keys — 304

Securely store the cryptographic digital signature keys — 306

307 — Attempt to access and/or create digitally signed data

308

Compute a first cryptographic term R — 310

Split the first cryptographic term "R" into an initial portion "" and a remainder portion "d" — 312

314

To operation 316

To operation 324

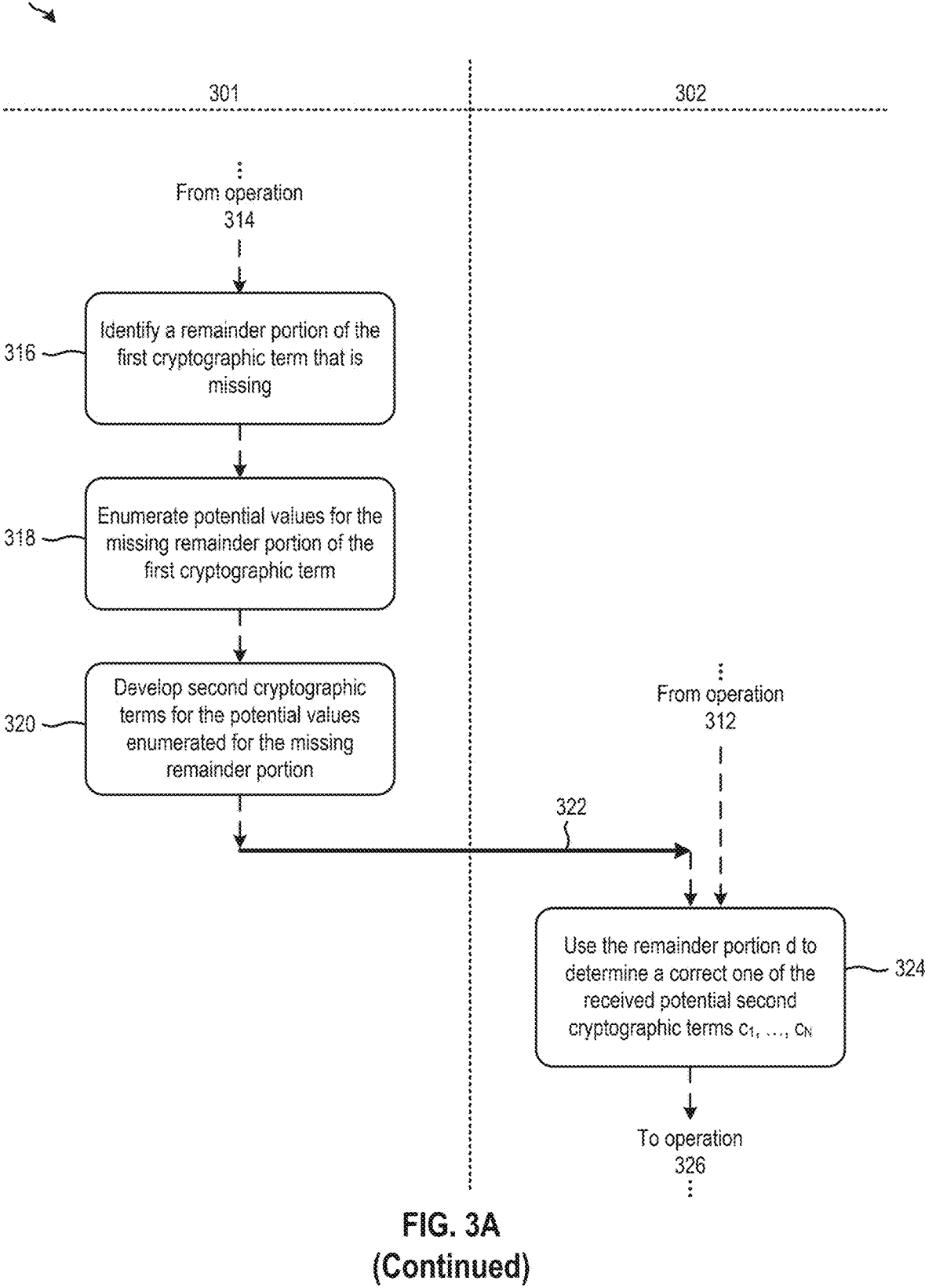

300

301

302

From operation
314

316 — Identify a remainder portion of the first cryptographic term that is missing 318 — Enumerate potential values for the missing remainder portion of the first cryptographic term 320 — Develop second cryptographic terms for the potential values enumerated for the missing remainder portion

322

From operation
312

324 — Use the remainder portion d to determine a correct one of the received potential second cryptographic terms $c_1, \ldots, c_N$ To operation
326

FIG. 3A
(Continued)

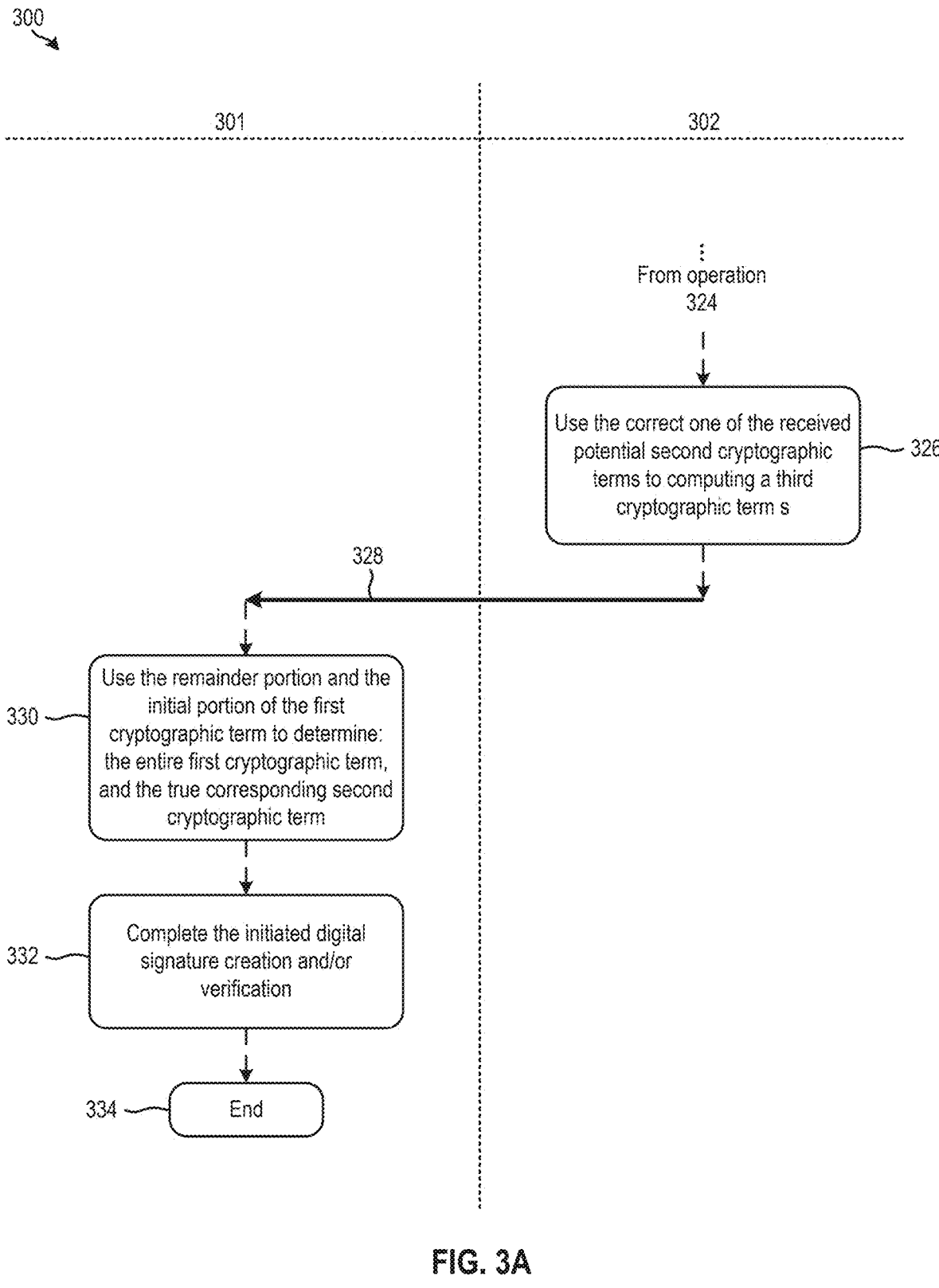

300

301 | 302

From operation
324

Use the correct one of the received potential second cryptographic terms to computing a third cryptographic term s — 326

328

330 — Use the remainder portion and the initial portion of the first cryptographic term to determine: the entire first cryptographic term, and the true corresponding second cryptographic term 332 — Complete the initiated digital signature creation and/or verification 334 — End FIG. 3A
(Continued)

350

360

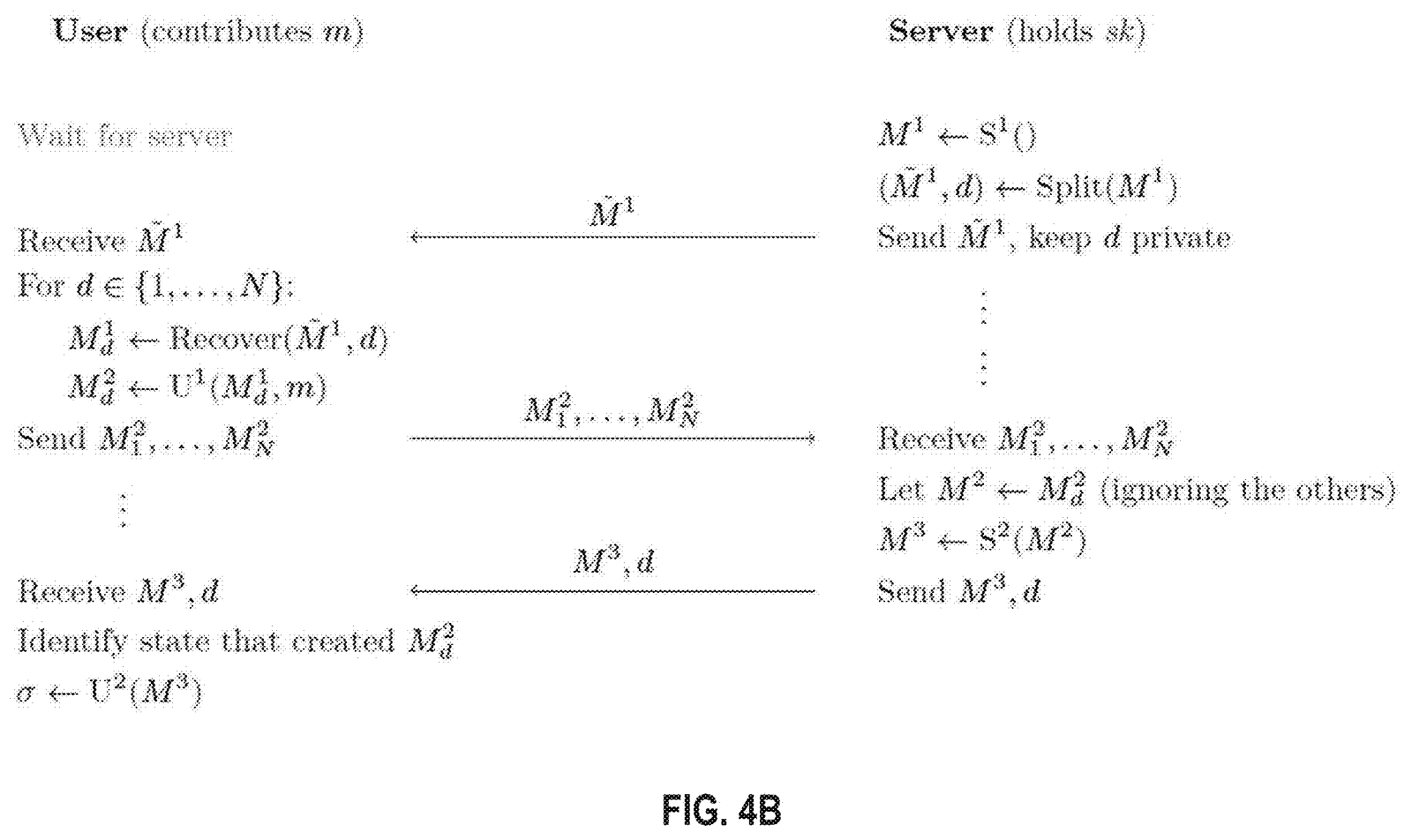

Server (holds $sk$)

$M^1 \leftarrow S^1()$ $(\bar{M}^1, d) \leftarrow \text{Split}(M^1)$

Send $\bar{M}^1$, keep $d$ private $\vdots$

Receive $M_1^2, \ldots, M_N^2$

Let $M^2 \leftarrow M_d^2$ (ignoring the others)

$M^3 \leftarrow S^2(M^2)$

Send $M^3, d$ $\xrightarrow{\quad \bar{M}^1 \quad}$ $\xleftarrow{\quad M_1^2, \ldots, M_N^2 \quad}$ $\xrightarrow{\quad M^3, d \quad}$

User (contributes $m$)

Wait for server

Receive $\bar{M}^1$

For $d \in \{1, \ldots, N\}$:

$\quad M_d^1 \leftarrow \text{Recover}(\bar{M}^1, d)$ $\quad M_d^2 \leftarrow U^1(M_d^1, m)$ Send $M_1^2, \ldots, M_N^2$ $\vdots$ Receive $M^3, d$ Identify state that created $M_d^2$ $\sigma \leftarrow U^2(M^3)$

FIG. 4B

SECURE DIGITAL SIGNATURE SCHEMES

BACKGROUND

The present invention relates to data authentication, and more specifically, this invention relates to improving digital signature implementation.

Data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments. For example, signature schemes are a core cryptographic building block that provides authentication over networks, e.g., like the Internet.

However, conventional cryptographic schemes like interactive signature schemes have recently been broken by a discovered class of attacks-Random inhomogeneities in an Overdetermined Solvable system of linear equations (or "ROS") attacks. A ROS attack includes correlating many concurrent signature sessions and forging a signature. In other words, ROS attacks exploit concurrent executions of multiple interactions to eventually improperly access (e.g., utilize) a digital signature. This has resulted in practical and successful attacks being executed against systems that implement a wide variety of different conventional cryptographic signature schemes.

While attempts to overcome such attacks have been made, they have all fallen short of providing solutions, e.g., by undesirably introducing new primitives, consuming greater amounts of resources, causing significant increases in latency, etc. Accordingly, a need exists for secure and effective digital signatures that do not fall prey to recent advancements in attack capabilities.

SUMMARY

A computer-implemented method (CIM), according to one approach, includes: computing a first cryptographic term in response to receiving a session request from a user. The first cryptographic term is split into an initial portion and a remainder portion, where the remainder portion includes at least one bit. The initial portion of the first cryptographic term is sent to the user, and two or more different potential second cryptographic terms are received from the user. The at least one bit in the remainder portion is used to determine a correct one of the potential second cryptographic terms. Moreover, the correct one of the potential second cryptographic terms is used to compute a third cryptographic term. Furthermore, the third cryptographic term is sent to the user.

A computer program product (CPP), according to another approach, includes: a set of one or more computer-readable storage media. The CPP also includes program instructions that are collectively stored in the set of one or more storage media, and which are for causing a processor set to perform any combination(s) of the foregoing methodologies.

A computer system (CS), according to yet another approach, includes: a processor set, and a set of one or more computer-readable storage media. The CS further includes program instructions that are collectively stored in the set of one or more storage media, and which are for causing the processor set to perform any combination(s) of the foregoing methodologies.

A CIM, according to still another approach, includes: receiving, from a server, an initial portion of a first cryptographic term. The CIM further includes identifying a remainder portion of the first cryptographic term that is missing. Potential values for the missing remainder portion of the first cryptographic term are enumerated. Moreover, potential second cryptographic terms are developed for the respective potential values enumerated for the missing remainder portion. The potential second cryptographic terms are further sent to the server.

A CPP, according to still another approach, includes: a set of one or more computer-readable storage media. The CPP also includes program instructions that are collectively stored in the set of one or more storage media, and which are for causing a processor set to perform any combination(s) of the foregoing methodologies.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 4B is a representational view of the in-use example in FIG. 4A converted into logical statements, in accordance with an in-use example.

DETAILED DESCRIPTION

Figure 2:
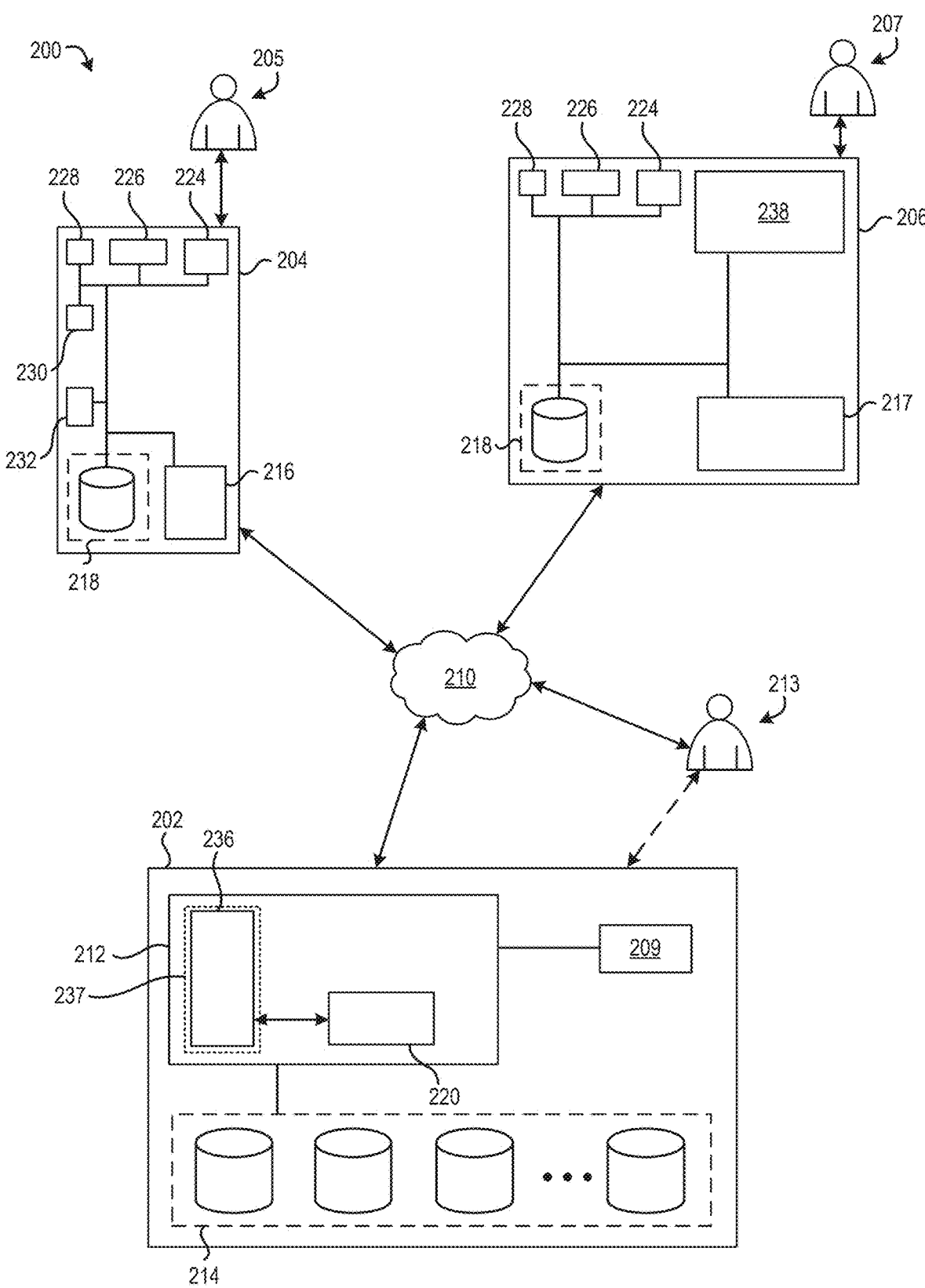
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for improving the authenticity (e.g., reliability) of digital signatures used across various systems. Approaches herein are thereby able to solve recent exploits of security flaws (e.g., weakness) in conventional cryptographic interactive signature schemes. Approaches herein thwart various attacks by sending an incomplete copy of information associated with utilizing a cryptographic signature. One or more bits may be removed from the cryptographic signature information. Moreover, by deferring sending this removed one or more bits (e.g., "suppressed information") to a later point in the exchange with a user (e.g., the last round of communication therebetween), approaches herein are desirably able to robustly protect against security attacks, and preserve compatibility with the unmodified protocols. These improvements are also achieved without increasing network overhead, without utilizing any advanced cryptographic tools, and without causing a notable increase to computational overhead, e.g., as will be described in further detail below.

In one general approach, a CIM includes: computing a first cryptographic term in response to receiving a session request from a user. The first cryptographic term is split into an initial portion and a remainder portion, where the remainder portion includes at least one bit. The initial portion of the first cryptographic term is sent to the user, and two or more different potential second cryptographic terms are received from the user. The at least one bit in the remainder portion is used to determine a correct one of the potential second cryptographic terms. Moreover, the correct one of the potential second cryptographic terms is used to compute a third cryptographic term. Furthermore, the third cryptographic term is sent to the user.

It follows that approaches herein are desirably able to protect interactive signature schemes from attacks (e.g., such as ROS attacks) without negatively impacting operational efficiency. Approaches herein involve elegant and efficient ways of converting interactive schemes (e.g., broken or not) into variants that ultimately thwart ROS attacks. These approaches desirably thwart any such attacks by sending an incomplete copy of the information associated with utilizing a cryptographic signature. For instance, one or more bits may be removed from the cryptographic signature information before it is sent to a requesting user. This desirably prevents the cryptographic signature information from being exposed, ensuring data security and retention.

In some implementations, the CIM further includes sending the at least one bit in the remainder portion to the user. Combining the at least one bit in the remainder portion and the initial portion of the first cryptographic term produces: the first cryptographic term, and the correct one of the potential second cryptographic terms. Moreover, the session request is received at a server from the user in some implementations. Accordingly, the computing of the first cryptographic term includes: using one of a number of cryptographic signature keys that are stored at the server.

While cryptographic terms may be intended for specific targets (e.g., users), the act of sending the terms over a network or other shared communication interface exposes them to adversaries that may have access to (e.g., are "watching") the public traffic. Thus, if the complete cryptographic value were to be sent over a network rather than only the initial portion, it can be captured by attacks and render any digital signatures created using the cryptographic term and/or the corresponding secret digital signature key, useless. However, it is virtually impossible for an adversary party to guess the original value of a cryptographic term when only given access to remainder portion. Thus, the act of intentionally splitting one or more bits from the first cryptographic term to create a remainder portion which is kept in a secure location (e.g., at a server) as performed by the approaches herein guarantees the authenticity of digital signatures created and/or verified using the base pair of private and public cryptographic digital signature keys used.

The size of the remainder portion may vary in some implementations. For instance, in some implementations, the remainder portion includes one bit. Thus, two different potential second cryptographic terms may be received from the user. In other implementations, the remainder portion includes two bits. Thus, four different potential second cryptographic terms may be received from the user.

Approaches herein are thereby desirably able to avoid cryptographic terms from being exposed. As noted above, by sending only a partial encoding of a transmitted value in a first (interactive) communication step and delaying the missing encoding information from being shared, an original cryptographic value may be fully recovered while also desirably disabling ROS attacks (and others). Moreover, these improvements come without negatively impacting the functionality and/or efficiency of the underlying signature scheme. For instance, no additional cryptographic primitives are involved, and no additional communication steps are performed, thereby not adding any extra network latency. Moreover, only a few additional bits are sent over the wire, causing a negligible increase to network traffic.

In some implementations, the splitting of the first cryptographic term includes: compressing an elliptical curve point that corresponds to the first cryptographic term. However, in other implementations, the splitting of the first cryptographic term in a discrete logarithm setting includes: dropping a least significant bit from the first cryptographic term.

Approaches herein are thereby able to achieve a desired level of security by adjusting how the first cryptographic term is split. For instance, elliptic curve based cryptography has several advantages over other public-key cryptography algorithms. Approaches herein are thereby able to provide a high level of security with shorter key lengths than other cryptography algorithms. This is at least partially because elliptic curve based cryptography is based on the discrete logarithm problem, which is much harder to solve than the factoring of large numbers, which other schemes use. Moreover, dropping a least significant bit from the first cryptographic term may achieve a similar level of security while maintaining a lower overall level of compute overhead.

In another general approach, a CPP includes: a set of one or more computer-readable storage media. The CPP also includes program instructions that are collectively stored in the set of one or more storage media, and which are for causing a processor set to perform any combination(s) of the foregoing methodologies.

In still another general approach, a CS includes: a processor set, and a set of one or more computer-readable storage media. The CS further includes program instructions that are collectively stored in the set of one or more storage media, and which are for causing the processor set to perform any combination(s) of the foregoing methodologies.

In another general approach, a CIM includes: receiving, from a server, an initial portion of a first cryptographic term. The CIM further includes identifying a remainder portion of the first cryptographic term that is missing. Potential values for the missing remainder portion of the first cryptographic term are enumerated. Moreover, potential second cryptographic terms are developed for the respective potential values enumerated for the missing remainder portion. The potential second cryptographic terms are further sent to the server.

Again, approaches herein are thereby desirably able to protect interactive signature schemes from attacks (e.g., such as ROS attacks) without negatively impacting operational efficiency. These approaches desirably thwart any such attacks by sending an incomplete copy of the information associated with utilizing a cryptographic signature. For instance, one or more bits may be removed from the cryptographic signature information before it is sent to a requesting user. Thus, the requesting user is able to receive the desired cryptographic information without exposing it, ensuring data security and retention.

In some implementations, the CIM above also includes: receiving a third cryptographic term from the server, and receiving the missing remainder portion of the first cryptographic term. The first cryptographic term is thereby produced by combining the remainder portion of the first cryptographic term and the initial portion of the first cryptographic term. Moreover, a desired cryptographic signature can be accessed using: the third cryptographic term, the first cryptographic term, and a correct one of the potential second cryptographic terms.

Again, while cryptographic terms may be intended for specific targets (e.g., users), the act of sending the terms over a network or other shared communication interface exposes them to adversaries that may have access to the public traffic. Thus, if the complete cryptographic value were to be sent over a network rather than only the initial portion, it can be captured by attacks and render any digital signatures created using the cryptographic term and/or the corresponding secret digital signature key, useless. However, it is virtually impossible for an adversary party to guess the original value of a cryptographic term when only given access to remainder portion. Thus, the act of intentionally splitting one or more bits from the first cryptographic term to create a remainder portion which is kept in a secure location (e.g., at a server) as performed by the approaches herein guarantees the authenticity of digital signatures created and/or verified using the base pair of private and public cryptographic digital signature keys used.

In yet another general approach, a CPP includes: a set of one or more computer-readable storage media. The CPP also includes program instructions that are collectively stored in the set of one or more storage media, and which are for causing a processor set to perform any combination(s) of the foregoing methodologies.

In some implementations, a verified Host with access to a secure data repository may issue a data access request. The data being read and/or written as a result of the data access request may be sensitive and is preferably protected "in flight" between the Host and the data repository. Accordingly, cryptographic signatures may be used. Specifically, in response to a pair of keys are selected from a queue (e.g., pool), and the selected pair of keys are used to compute a first cryptographic term "R." The first cryptographic term R is further split into an initial portion $\overline{R}$, and a remainder portion "d." The initial portion $\overline{R}$ is sent to the Host, while the remainder portion "d" is maintained at a central server. The remainder portion d is preferably smaller than the initial portion $\overline{R}$, however the number of bits that are actually in the remainder portion d may be one or more depending on the approach. For example, the number of bits in the remainder portion d may be determined by a relative importance of data being digitally signed and/or verified. The initial portion $\overline{R}$ received at the Host is evaluated and used to enumerate each potential (e.g., possible) value for the first cryptographic term. Each of the potential first cryptographic terms $R_1, \ldots, R_N$ are further used to produce corresponding second cryptographic terms $c_1, \ldots, c_N$. The second cryptographic terms $c_1, \ldots, c_N$ are further returned to the central server. In response to receiving the second cryptographic terms $c_1, \ldots, c_N$, the server uses the retained remainder portion d to identify the correct one of the second cryptographic terms $c_d$. The true second cryptographic term $c_d$ may thereby be used to compute a third cryptographic term "s." The third cryptographic term s and the retained remainder portion d, are thereby sent to the Host over a network (not shown). As a result, the "correct" first cryptographic term $R_d$, second cryptographic term $c_d$, and known third cryptographic term s, are accessible. Moreover, these cryptographic terms $R_d$, $c_d$, s may be used to digitally sign data, verify a digital signature, decrypt data, etc., e.g., as would be appreciated by one skilled in the art after reading the present description.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved digital signature code at block 150 for improving the authenticity (e.g., reliability) of digital signatures used across various systems. Approaches herein are thereby able to solve recent exploits of security flaws (e.g., weakness) in conventional cryptographic interactive signature schemes, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments. For example, signature schemes are a core cryptographic building block that provides authentication over networks, e.g., like the Internet.

However, conventional interactive signature schemes have recently been broken by the timely discovered ROS attacks. As noted above, a ROS attack includes correlating many concurrent signature sessions and forging a signature. In other words, ROS attacks exploit concurrent executions of multiple interactions to eventually improperly access (e.g., utilize) a digital signature. This has resulted in practical and successful attacks being executed against systems that implement a wide variety of different conventional cryptographic signature schemes.

While attempts to implement anonymous tokens have been made in an effort to overcome these ROS attacks, such schemes are specific and cannot be generalized without completely modifying the verification algorithms that are implemented. Other attempts have added an extra round of communication while using complex cryptographic primitives to overcome the ROS attacks. However, these attempts have also fallen short of solving the ROS attacks, e.g., by undesirably introducing new primitives, consuming greater amounts of resources, increasing latency, etc.

In sharp contrast to the foregoing shortcomings experienced by conventional products, approaches herein are desirably able to protect interactive signature schemes from ROS attacks without negatively impacting operational efficiency. Approaches herein involve elegant and efficient ways of converting interactive schemes (e.g., broken or not) into variants that ultimately thwart ROS attacks. For instance, only a partial encoding of a transmitted value is sent in a first (interactive) communication step. Only at a later point is the missing information shared, thereby allowing for the full recovery of an original cryptographic term (e.g., value).

These modifications are able to fully disable ROS attacks (and others) without negatively impacting the functionality and/or efficiency of the underlying signature scheme. For instance, no additional cryptographic primitives are involved, and no additional communication steps are performed, thereby not adding any extra network latency. Moreover, only a few additional bits are sent over the wire, causing a negligible increase to network traffic. Approaches herein are thereby able to desirably improve performance in various systems that rely on authenticity, e.g., such as electronic cash systems, electronic voting, anonymous credentials, contact tracing apps, virtual private network (VPN), private relays, access tokens, blind contract signing, blind coin swaps, trustless tumbler services, etc. Approaches herein are also desirably able to improve reliability of interactive signature schemes, e.g., such as applications connected to Central Bank Digital Currency (CBDC) and Hyperledger Fabric), clients' and competitors' products, etc., e.g., as will be described in further detail below.

Looking now to FIG. 2, a distributed data storage system 200 in accordance with one approach. As an option, the present system 200 may be implemented in conjunction with features from any other approach listed herein, such as those described with reference to the other FIGS. However, this distributed data storage system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGURES) may be deemed to include any possible permutation.

As shown, the distributed data storage system 200 includes a central server 202 that is connected to user device 204 and edge node 206. Specifically, the central server 202, user device 204, and edge node 206 are connected to a network 210 that allows for data (e.g., information, commands, requests, instructions, responses, encrypted data, etc.) to be sent between the devices 202, 204, 206 at any of the locations.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between the devices 202, 204, 206 at the different locations, regardless of the amount of separation which exists therebetween, e.g., despite being positioned at different geographical locations. It should also be noted that the devices 202, 204, 206 at the different locations may be connected to each other (and/or other locations) differently depending on the approach. According to an example, two host locations may be located relatively close to each other and connected by a wired connection, e.g., a cable, a fiber-optic link, a wire, etc.; etc., or any other type of connection which would be apparent to one skilled in the art after reading the present description.

While being connected to network 210 allows devices 202, 204, 206 at different locations to communicate with each other, it also exposes any information sent over the network 210 to attacks. Cryptographic digital signatures (also referred to herein as "digital signatures") have thus been developed in order to ensure authenticity of information, regardless of how it may be received. It follows that digital signatures are essentially mathematical schemes that allow the authenticity of information (e.g., digital messages and/or documents) to be verified. In other words, a verified digital signature accompanying data gives a recipient confidence that the message came from trusted (e.g., known) sender.

Digital signature schemes as used in the approaches herein may implement (e.g., utilize) cryptographic digital signature keys. Depending on the approach, these keys may be formed using a key generation algorithm and stored in memory. Moreover, the keys may be formed in pairs of private and public keys. A signing algorithm that, given a message and a private key, thereby produces a digital signature. This digital signature may also be verified by a signature verifying algorithm based at least in part on the message, the public key, and the digital signature.

While it should be computationally infeasible to generate and/or access (e.g., utilize) a valid signature without having legitimate access to that party's private key, recent exploits of security flaws (e.g., weakness) in conventional cryptographic interactive signature schemes have eliminated the ability to ensure authenticity of information. As noted above, conventional cryptographic interactive signature schemes have recently been broken by ROS attacks which exploit concurrent executions of multiple interactions.

In sharp contrast, approaches herein offer efficient, generic, and robust protection against attacks, including these ROS attacks. Approaches herein thwart any such attacks by sending an incomplete copy of the information associated with utilizing a cryptographic signature. For instance, one or more bits may be removed from the cryptographic signature information before it is sent to a requesting user.

With continued reference to FIG. 2, it follows that the user device 204 may initiate a session request with edge node 206 and/or central server 202. In another approach, edge node 206 may initiate a session request with central server 202. In response to receiving a session request, the cryptographic information associated with utilizing a digital signature that is associated with the received session request is split into an initial portion and a remainder portion. For example, one or more bits may be removed from the cryptographic digital signature information at the central server 202 before being sent to a requesting user. Again, deferring sending this suppressed one or more bits from the central server 202 to a later point in the exchange with the requesting user (e.g., the last round of communication therebetween), allows approaches herein to robustly protect against security attacks, and preserve compatibility with unmodified protocols. Moreover, these improvements are achieved without increasing network overhead, without utilizing any advanced cryptographic tools, without causing a notable increase to computational overhead, etc.

With continued reference to FIG. 2, the user device 204 and edge node 206 may have different configurations than the central server 202. For example, in some implementations the central server 202 includes a large (e.g., robust) processor 212 coupled to a cache 209 and memory 214 having a relatively high storage capacity. The central server 202 is thereby able to process and store a relatively large amount of data, allowing it to be connected to, and manage, multiple different remote locations. The central server 202 may also be configured to receive and/or generate cryptographic signature keys that are stored in memory 214. For example, corresponding pairs of private keys and public keys are developed that together are able to form cryptographic digital signatures that can be used to authenticate data, e.g., e.g., as would be appreciated by one skilled in the art after reading the present description.

In some approaches, cryptographic signature keys and related information may be stored in a secure software environment of the central server 202 that restricts access to the keys. According to an example, the secure software environment may only be accessed locally (e.g., not over network 210), thereby avoiding any nefarious remote access attempts. In other approaches, the edge node 206 itself may be configured to receive and/or generate cryptographic signature keys, as well as store them in a secure software environment in controller 217 thereof.

It should be noted that with respect to the present description, "data" and "information" may include any desired type of details. For instance, in different implementations data and information can include raw sensor data, metadata, program commands, instructions, outputs generated by trained artificial intelligence based models, etc. Moreover, while implementations herein are described in the context of data that has been authenticated (e.g., protected) with a digital signature, data may also be processed differently depending on the approach. In other approaches, data may be compressed before being signed with a digital signature, e.g., to reduce memory consumption. In still other approaches, the data may be converted to a different format, type of information, etc. before being stored in memory, used to train one or more AI based models, used to generate new cryptographic signature keys, etc.

The way that data is protected has an impact on how that data may be processed and/or stored. For instance, the processor 212 may use a secure software environment 236 to process incoming encrypted data and/or generate encrypted data. In other words, the secure software environment 236 may be designated to generate, store, apply, etc., cryptographic signature keys. The secure software environment 236 may thereby apply digital signatures to data and/or verify digital signatures that are received. It follows that the secure software environment 236 may only be accessed by verified (e.g., known) sources to secure the cryptographic signature keys. According to a non-limiting example, secure engine 220 may be designated (e.g., verified) to cross a logical boundary 237 separating the secure software environment 236 from the remainder of the processor 212 and central server 202 in general. In other words, a logical boundary 237 may only be crossed by secure engine 220, and the logical boundary 237 prevents any other aspects of the processor 212 from accessing the secure software environment 236 or any data being processed (e.g., digitally signed) therein. Software being run outside the logical boundary 237—other than any software running in the secure engine 220—is thereby unable to directly access any data being processed by software running in the secure software environment 236.

The ability to insulate the secure software environment 236 from exterior access effectively hides any data sent to and/or generated at the secure software environment 236. Thus, although the secure software environment 236 is located at the central server 202, it may implement confidential details (e.g., pairs of private and public cryptographic signature keys without exposing them to the central server 202 and/or entities connected thereto, e.g., such as administrator 213. According to an example, the secure software environment 236 may include one or more private keys configured to encrypt and/or decrypt data according to an encryption standard. The secure software environment 236 may thereby be able to decrypt encrypted data and process (e.g., deduplicate and/or compress) the decrypted data without exposing any of the decrypted data and/or private key information to a remainder of the processor 212, e.g., as will be described in further detail below. Accordingly, the processor 212, secure engine 220, and/or the secure software environment 236 therein may be used to perform one or more operations in method 300 of FIG. 3A below.

Referring still to FIG. 2, user device 204 may be a mobile phone, laptop computer, tablet, etc., that includes a processor 216 coupled to memory 218. The processor 216 may receive inputs from, and interface with, user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc.

Looking to edge node 206, some of the components included therein may be the same or similar to those included in user device 204, and have therefore been given corresponding numbering. For instance, controller 217 is coupled to memory 218, a display screen 224, keys of a computer keyboard 226, and a computer mouse 228, which are accessible to administrator 207. Additionally, the controller 217 is coupled to an AI module 238. The AI module 238 may include any desired number and/or type of AI-based models, e.g., such as machine learning models, deep learning models, neural networks, etc. Moreover, the models may be trained to perform certain procedures (e.g., identify patterns), e.g., as would be appreciated by one skilled in the art after reading the present description. In some approaches, one or more models may be trained to identify and/or enumerate various potential values for missing portions of cryptographic terms, e.g., as will be described in further detail below.

As previously mentioned, approaches herein are desirably able to solve recent exploits of security flaws (e.g., weakness) in conventional cryptographic interactive signature schemes. For instance, approaches herein thwart ROS attacks (and others) by sending an incomplete copy of information associated with utilizing a cryptographic signature. For instance, one or more bits may be removed from the cryptographic signature information. Moreover, by deferring sending this removed one or more bits (e.g., "suppressed information") to a later point in the exchange with a user (e.g., the last round of communication therebetween), approaches herein are desirably able to robustly protect against security attacks, and preserve compatibility with the unmodified protocols. These improvements are also achieved without increasing network overhead, without utilizing any advanced cryptographic tools, and without causing a notable increase to computational overhead.

Figure 3A:
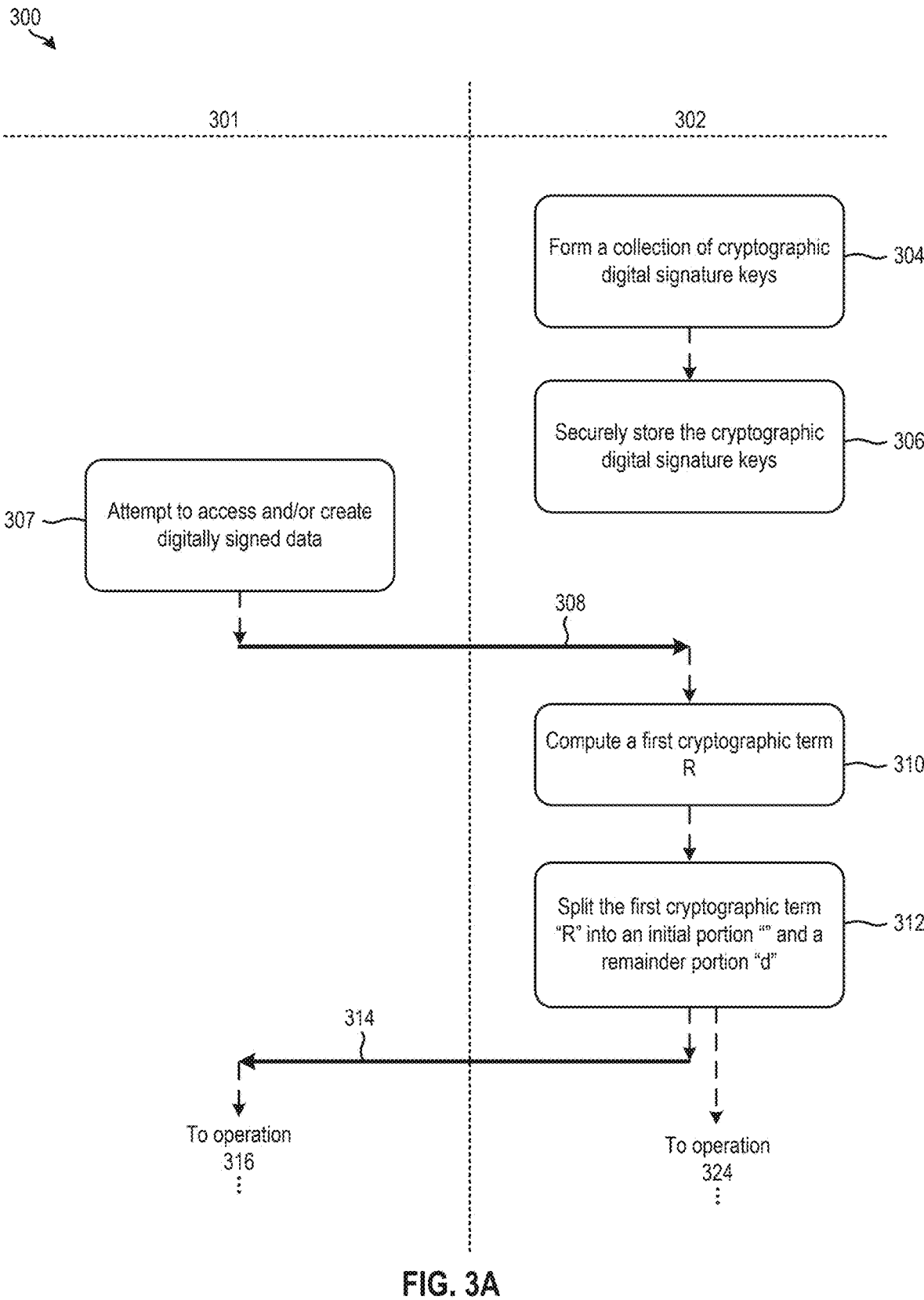
FIG. 3A is a flowchart of a method, in accordance with one approach.

Looking now to FIG. 3A, a flowchart of a computer-implemented method 300 for improving authenticity of digital signatures is illustrated in accordance with one approach. The method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions. Each of the operations in method 300 may be performed by any suitable component of the operating environment. For example, the nodes 301, 302 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, each of which represent one or more processors, controllers, computer, etc., positioned at a different location in a distributed system. For example, in some approaches one or more of the operations in method 300 may involve one or more components in a system having a secure engine that is connected to a secure software environment and protected area of memory, which may be connected to a central server as part of a larger distributed system. Accordingly, node 301 may include one or more processors which are located at secure engine in a processor at a central server of a distributed system (e.g., see secure engine 220 of FIG. 2). In other approaches, node 301 may simply include one or more processors that are positioned at a central server of a distributed system (e.g., see processor 212 of FIG. 2). Moreover, node 302 may include one or more processors which are located at a user environment (e.g., see processor 216 of FIG. 2). In still other approaches, node 301 may include one or more processors positioned at an edge node (e.g., see controller 217 of FIG. 2), while node 302 includes one or more processors at a user environment (e.g., see processor 216 of FIG. 2).

Accordingly, commands, code, data, metadata outlining code updates, etc., may be sent between the nodes 301 and 302, depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

As shown, operations 304 is performed at node 301. There, operation 304 includes forming a collection of cryptographic digital signature keys. In other words, operation 304 includes generating, receiving, identifying, etc., various cryptographic digital signature keys that may be used to form digital signatures. Moreover, operation 306 includes storing the cryptographic digital signature keys at node 301. The cryptographic digital signature keys are preferably stored in a secure location at node 301. According to one approach, the cryptographic digital signature keys are stored in a secure software environment at node 301 (e.g., see secure software environment 236 in FIG. 2). In other approaches, specific portions of memory at node 301 may be designated and configured as secure storage that is used to save the digital signature keys. The cryptographic digital signature keys are preferably formed in corresponding pairs of a public key and a private key. While a public key may be removed from a secure software environment and shared publicly in some approaches, the private key preferably remains hidden (e.g., secure).

Depending on the approach, operations 304, 306 may be performed periodically, in response to a predetermined condition being met (e.g., in response to a number of available digital signature key pairs falling below a predetermined range), etc. It follows that a supply of digital signature key pairs is preferably available to satisfy any inquiries that may be received over time. For instance, sources (e.g., users) may initiate session requests with a server configured to support cryptographic digital signatures. The session requests may correspond to sensitive data that is preferably protected (or verified) by one or more security based measures, e.g., such as cryptographic digital signatures. The process of accessing the sensitive data may thereby involve digitally signing the data or overarching file and/or verifying data that has already been digitally signed.

Operation 307 thereby includes attempting to access and/or create digitally signed data (e.g., such as a message). Moreover, operation 308 includes initiating a session request involving sensitive data, and delivering the session request to node 301. As noted above, the session request may be received from a user in some approaches. However, the session request may be received from a running application, as a result of one or more AI based models generating certain outputs, automatically in response to a predetermined condition being met, etc. Thus, while the session request is shown as being received from node 302, node 301 may receive session requests from various sources, e.g., that may be connected to the same network. It should also be noted that one or more session requests may be received at various times. One or more of the operations in method 300 may thereby be repeated in an iterative fashion in response to each session request that is received, and which involves data protected by digital signature.

In response to receiving the session request at node 301, method 300 advances to operation 310. There, operation 310 includes computing a first cryptographic term, which is also referred to as "R" herein. The process of computing (e.g., determining) the first cryptographic term may involve selecting an available pair of private and public digital signature keys. In some approaches, a pair of digital signature keys may be randomly selected from an array of available digital signature keys. In other approaches, the received session request may specify a certain type and/or number of digital signature keys to use while computing the first cryptographic term. In other approaches, a "next" digital signature key in a queue according to a first-in-first-out scheme, a first-in-last-out scheme, a last-in-first-out scheme, etc., or any other desired scheme. In still another approach, a digital signature key pair correlated with the source (e.g., user) from which the session request was received, is used to generate the first cryptographic term.

From operation 310, method 300 advances to operation 312. There, operation 312 includes splitting the first cryptographic term "R" into an initial portion "R" and a remainder portion "d". In other words, operation 310 includes dividing the first cryptographic term into two different portions. In preferred approaches, one of the portions formed in operation 310 includes a small amount of information. For instance, the remainder portion d may include between 1 bit and 10 bits, more preferably between 1 bit and 5 bits, still more preferably between about 1 bit and about 3 bits. As noted above, by sending only a partial encoding of a transmitted value in a first (interactive) communication step and delaying the missing encoding information from being shared, an original cryptographic term may be fully recovered while also desirably disabling ROS attacks (and others). Moreover, these improvements come without negatively impacting the functionality and/or efficiency of the underlying signature scheme. For instance, no additional cryptographic primitives are involved, and no additional communication steps are performed, thereby not adding any extra network latency. Moreover, only a few additional bits are sent over the wire, causing a negligible increase to network traffic.

Figure 3B:
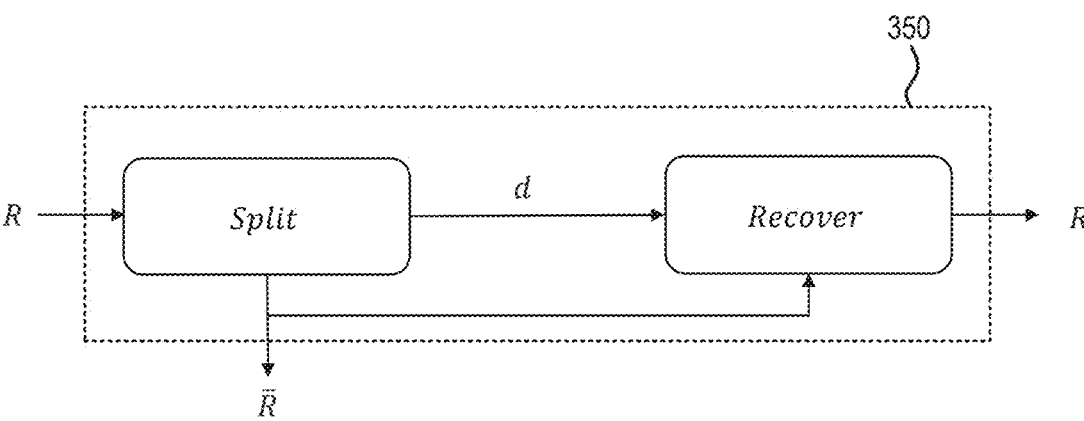
FIG. 3B is a partial representational view of a split and recovery module, in accordance with one approach.

Referring momentarily now to FIG. 3B, a split and recovery module 350 is shown in accordance with one approach. As an option, the present split and recovery module 350 may be implemented in conjunction with features from any other approach listed herein. According to some approaches, which are in no way intended to be limiting, the split and recovery module 350 may be used to divide a first cryptographic term into two different portions. It follows that the module 350 shown in FIG. 3B may be used, at least in part, to perform operation 310 of FIG. 3A. However, such split and recovery module 350 and others presented herein may be used in various applications and/or in permutations which may or may not be specifically described in the illustrative approaches listed herein. Further, the split and recovery module 350 presented herein may be used in any desired environment. Thus FIG. 3B (and the other FIGURES) may be deemed to include any possible permutation.

The split and recovery module 350 is shown as receiving a first cryptographic term "R" as an input. As noted above, the first cryptographic term "R" may be determined (e.g., computed) from an original pair of private and public cryptographic digital signature keys, e.g., as would be appreciated by one skilled in the art after reading the present description. This value "R" is provided to a Split sub-assembly (e.g., function), which divides the original cryptographic term "R" into an initial portion "R̄" and a remainder portion "d." In some approaches, the Split sub-assembly encodes binary string "R" into "R̄," and outputs a decoding value "d." While the initial portion "R̄" may be returned to the source that originally initiated the session request (e.g., see operation 308 from node 301 in FIG. 3A), the remainder portion "d" may remain protected (e.g., at node 302 of FIG. 3A).

With continued reference to FIG. 3B, the remainder portion "d" and initial portion "R̄" may be combined in the Recover sub-assembly (e.g., function) to ultimately reproduce the original cryptographic term "R". In other words, the Recover sub-assembly is able to restore the string "R" if R̄'=R̄, and d'=d. Therefore, it is virtually impossible for an adversary party to correctly guess the original value of "R" when only given access to "R̄" in each and every concurrent session opened during the ROS attacks. Approaches herein are thereby able to protect an original cryptographic term by splitting it in two different portions.

According to one example, one or more of the cryptographic terms referenced herein may correspond to an elliptic curve. In this example, the process of splitting the first cryptographic term R may include compressing an elliptical curve point that corresponds to the first cryptographic term R. Similarly, a compressed elliptical curve point may be decompressed with access to the proper cryptographic information.

According to another example, one or more of the cryptographic terms referenced herein may correspond to a discrete logarithm setting. In this example, the process of splitting the first cryptographic term R may include dropping a least significant bit from the first cryptographic term R. Similarly, a least significant bit may be restored given access to the proper cryptographic information.

Approaches herein are thereby able to achieve a desired level of security by adjusting how the first cryptographic term is split. For instance, elliptic curve based cryptography has several advantages over other public-key cryptography algorithms. Approaches herein are thereby able to provide a high level of security with shorter key lengths than other cryptography algorithms. This is at least partially because elliptic curve based cryptography is based on the discrete logarithm problem, which is much harder to solve than the factoring of large numbers, which other schemes use. Moreover, dropping a least significant bit from the first cryptographic term may achieve a similar level of security while maintaining a lower overall level of compute overhead.

Returning now to FIG. 3A, the flowchart splits from operation 312, such that each portion of the original cryptographic term "R" is handled differently. For instance, method 300 advances from operation 312 to operation 314 where the initial portion R is sent from node 301 to node 302. In other words, operation 314 includes sending the initial portion R of the first cryptographic term R to the user at node 302. While this initial portion R may be intended for a specific target (e.g., user), the act of sending it over a network or other shared communication interface exposes it to adversaries that may have access to (e.g., are "watching") the public traffic. Thus, if the complete cryptographic term R were to be sent over a network in operation 314 rather than only the initial portion R̄, it can be captured by attacks, e.g., such as ROS attacks, that render any digital signatures created using the cryptographic term R and/or the corresponding secret digital signature key, useless. As noted above, it is virtually impossible for an adversary party to correctly guess the original value of "R" when only given access to "R̄" in each and every concurrent session opened during the ROS attacks. Thus, the act of intentionally splitting one or more bits from the first cryptographic term R to create a remainder portion "d" which is kept in a secure location (e.g., at a server) guarantees the authenticity of digital signatures created and/or verified using the base pair of private and public cryptographic digital signature keys used to form the cryptographic term R, initial portion R̄, and remainder portion d.

In response to receiving the initial portion R̄ at node 302, method 300 advances to operation 316. There, operation 316 includes identifying a remainder portion of the first cryptographic term that is missing. In other words, operation 316 includes quantifying how much (e.g., how many bits) of the initial cryptographic term R is absent from (or not included in) the received initial portion R̄. Although node 302 is only provided a portion of the initial cryptographic term R, the information in the received initial portion R̄ may be evaluated and used to quantify the remainder portion d created in operation 312 and kept at node 301.

As noted above, the amount of the initial cryptographic term R that is split from the initial portion R̄ and kept at node 301 may vary depending on the approach. For instance, in some approaches 1 bit of information is split from the remainder of an initial cryptographic term R. While removing 1 bit of information and sending a remaining initial portion R̄ over a public network is sufficient to protect approaches herein against various attacks, including ROS attacks, the remainder portion "d" may be larger in some approaches. For instance, the number of bits that are ultimately split from a cryptographic term R to form the remainder portion "d" may be positively correlated with the relative importance (e.g., security) of the underlying data being digitally signed and/or verified. Thus, in other approaches 2, 3, 4, 5, 6, 7, 8, 9, 10, 11, 12, 15, 19, 20, etc., bits of information may be split from a remainder of the initial cryptographic term R.

In response to identifying the amount of information (e.g., number of bits) that has been split into a remainder portion kept at node 301, method advances to operation 318. There, operation 318 includes enumerating potential values for the missing remainder portion of the first cryptographic term. In other words, operation 318 includes determining each of the values that a missing one or more bits may have and implementing them as potential recreations of the original cryptographic term R.

For example, in approaches where a single bit is split from the initial portion R̄ and is missing at node 302, operation

318 includes: (i) replacing the single missing bit with a bit having the value "1" and combining it with the initial portion $\bar{R}$, to form a first potential recreation "$R_1$" of the original cryptographic term R, and (ii) replacing the single missing bit with a bit having the value "0" and combining it with the initial portion $\bar{R}$, to form a second potential recreation "$R_2$" of the original cryptographic term R.

In another example, two bits are split from the initial portion $\bar{R}$ and are missing at node 302. In this example, operation 318 includes: (i) replacing the two missing bit with a pair of bits having the values [0, 0], and combining it with the initial portion $\bar{R}$, to form a first potential recreation "$R_1$" of the original cryptographic term R; (ii) replacing the two missing bit with a pair of bits having the values [0, 1], and combining it with the initial portion $\bar{R}$, to form a second potential recreation "$R_2$" of the original cryptographic term R; (iii) replacing the two missing bit with a pair of bits having the values [1, 0], and combining it with the initial portion $\bar{R}$, to form a third potential recreation "$R_3$" of the original cryptographic term R; and (iv) replacing the two missing bit with a pair of bits having the values [1, 1], and combining it with the initial portion $\bar{R}$, to form a fourth potential recreation "$R_4$" of the original cryptographic term R. In still other examples, the same general process may be applied to larger remainder portions, e.g., as would be appreciated by one skilled in the art after reading the present description.

Each of the potential recreations of the original cryptographic term R that are formed in operation 318 are preferably evaluated at node 302. Accordingly, method 300 advances from operation 318 to operation 320. There, operation 320 includes developing second cryptographic terms for the potential values enumerated for the missing remainder portion. It follows that in preferred approaches, each of the potential recreations of the original cryptographic term $R_1, \ldots, R_N$ are used to generate a respective second cryptographic terms $c_1, \ldots, c_N$. In some approaches, a respective one of the second cryptographic terms "$c_x$" may be generated by applying a corresponding one of the potential recreations "$R_x$" to data (e.g., a base message) being digitally signed in association with the data access attempted at operation 307. In other approaches, second cryptographic terms $c_x$ may be generated by applying potential recreations $R_x$ to a digital signature that is being verified in association with the data access attempted at operation 307.

From operation 320, method 300 advances to operation 322. There, operation 322 includes sending each of the second cryptographic terms $c_1, \ldots, c_N$ developed in operation 318, to node 301. In response to receiving the various second cryptographic terms at node 301, method 300 advances to operation 324 at node 301. There, operation 324 includes using the remainder portion d to determine a correct one of the received potential second cryptographic terms $c_1, \ldots, c_N$. In other words, operation 324 includes using the one or more bits in the remainder portion d split from the initial portion $\bar{R}$ in operation 312 to determine a correct one "$c_d$" of the second cryptographic terms that are received from node 302.

With continued reference to FIG. 3A, method 300 advances from operation 324 to operation 326. There, operation 326 includes using the "correct" one of the received potential second cryptographic terms to compute a third cryptographic term "s". With respect to the present description, the "correct" term refers to the one of the received potential second cryptographic terms that is produced by the initial portion $\bar{R}$ and the correct guess at the one or more bits that were split from the initial portion $\bar{R}$. Operation 326 may involve combining the initial portion $\bar{R}$ and the retained remainder portion d to produce a true (e.g., correct) second cryptographic term "$c_d$". Moreover, this true second cryptographic term $c_d$ may be compared against the received second cryptographic terms $c_1, \ldots, c_N$ to identify a match. In other approaches, the remainder portion d maintained at node 302 may simply be applied (e.g., compared) to each of the second cryptographic terms $c_1, \ldots, c_N$ to identify one that is supported, e.g., as would be appreciated by one skilled in the art after reading the present description.

Method 300 advances from operation 326 to operation 328. There, operation 328 includes sending the third cryptographic term "s" to the user (e.g., initiator) at node 302 along with the remainder portion "d". In response to receiving the third cryptographic term s and the remainder portion d, method advances to operation 330. There, operation 330 includes using the remainder portion and the initial portion of the first cryptographic term to determine the entire (e.g., complete or full) first cryptographic term and the true (e.g., correct) corresponding second cryptographic term. In other words, operation 330 includes combining (i) the initial portion R received from node 301 in operation 314, and (ii) the remainder portion d received from node 301 in operation 328. The process of combining the initial portion R of the first cryptographic term R and the remainder portion d is thereby able to produce the first cryptographic term R that was suppressed and kept at node 302 and determine the true (correct) second cryptographic term $c_d$ that was generated by node 301 in operation 320 among all the other second cryptographic terms $c_1, \ldots, c_N$.

In response to determining the cryptographic term R, method advances from operation 330 to operation 332. There, operation 332 includes successfully completing (e.g., satisfying) the digital signature creation and/or verification initiated above in operation 307. In other words, operation 332 includes using the third cryptographic term s received from node 301 in operation 328, the first cryptographic term R determined in operation 330, and the true second cryptographic term $c_d$ also determined in operation 330, to access (e.g., utilize) a desired cryptographic signature. Moreover, the desired cryptographic signature may be used to access data that has already been digitally signed and/or digitally sign specific data, e.g., as would be appreciated by one skilled in the art after reading the present description.

Figure 3C:
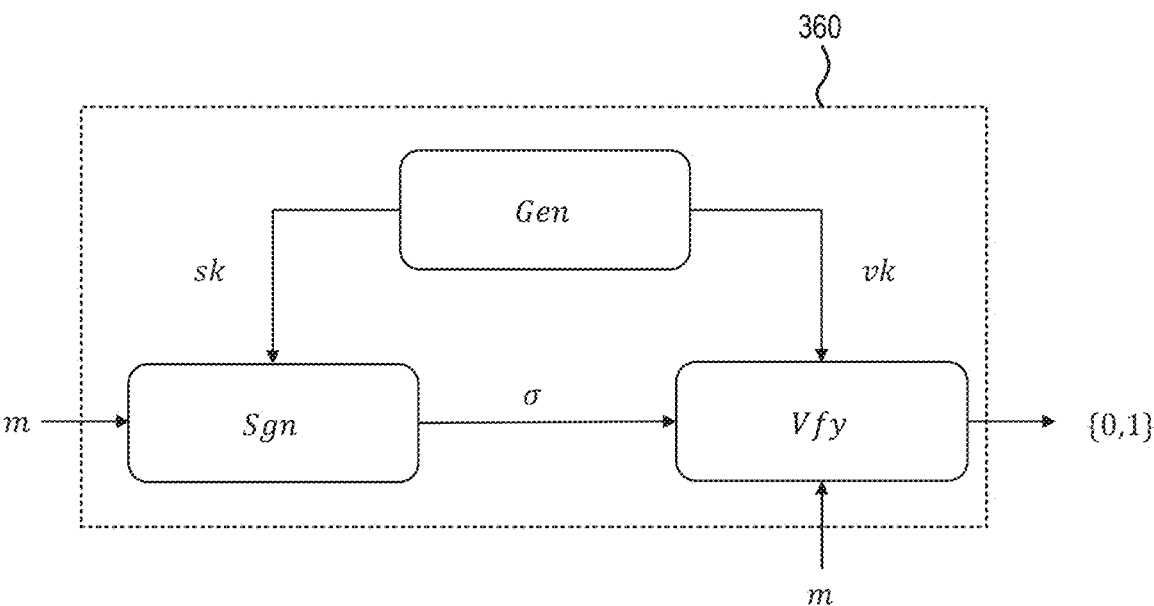
FIG. 3C is a partial representational view of a digital signature generation and verification module, in accordance with one approach.

Referring momentarily to FIG. 3C, a digital signature generation and verification module 360 is shown in accordance with one approach. As an option, the present module 360 may be implemented in conjunction with features from any other approach listed herein. According to some approaches, which are in no way intended to be limiting, the split and recovery module 360 may be used to generate a digital signature and/or verify one. It follows that the module 360 shown in FIG. 3C may be used, at least in part, to perform operation 332 of FIG. 3A. However, such module 360 may be used in any desired environment. Thus FIG. 3C (and the other FIGURES) may be deemed to include any possible permutation.

The digital signature generation and verification module 360 receives an input m from a user. The input "m" is supplied to a signature "Sgn" sub-assembly. Moreover, a digital signature key generation "Gen" sub-assembly produces a secret key "sk" and a verification key "vk." The secret key sk is provided to the signature "Sgn" sub-assembly which uses it to produce a digital signature "σ." Additionally, the verification "Vfy" sub-assembly is able to evaluate a digital signature "σ" along with the input "m" and the verification key "vk" to determine whether the digital signature is not verified "0" or verified "1", e.g., as would be appreciated by one skilled in the art after reading the present description.

Returning now to FIG. 3A, the flowchart of FIG. 3A proceeds from operation 332 to operation 334, whereby method 300 may end. However, it should be noted that although method 300 may end upon reaching operation 334, any one or more of the processes included in method 300 may be repeated in order to process additional session requests that may be received at a server. In other words, any one or more of the processes included in method 300 may be repeated for subsequently received session requests involving digital signatures associated with cryptographic digital signature key pairs, e.g., as described herein.

It should be noted that the terms "first cryptographic term," "second cryptographic term," and "third cryptographic term" are intended to refer to values that may be combined to gain access to a corresponding digital signature. In other words, the first, second, and third cryptographic terms include information that is capable of generating a digital signature and/or verifying an existing one in order to access respective data. Use of variables "R" and/or "c" and/or "s" herein are also in no way intended to be limiting. For instance, the same variables may be used to represent different underlying values in other approaches. In still other approaches, the underlying cryptographic values may be represented using any desired variable that is designated as such.

It follows that approaches herein are desirably able to improve the authenticity (e.g., reliability) of digital signatures used across various systems. Approaches herein are thereby able to solve recent exploits of security flaws (e.g., weakness) in conventional cryptographic interactive signature schemes. Approaches herein thwart ROS attacks (and others) by sending an incomplete copy of information associated with utilizing a cryptographic signature. One or more bits may be removed from the cryptographic signature information. Moreover, by deferring sending this removed one or more bits (e.g., "suppressed information") to a later point in the exchange with a user (e.g., the last round of communication therebetween), approaches herein are desirably able to robustly protect against security attacks, and preserve compatibility with the unmodified protocols. These improvements are also achieved without increasing network overhead, without utilizing any advanced cryptographic tools, and without causing a notable increase to computational overhead.

Figure 4A:
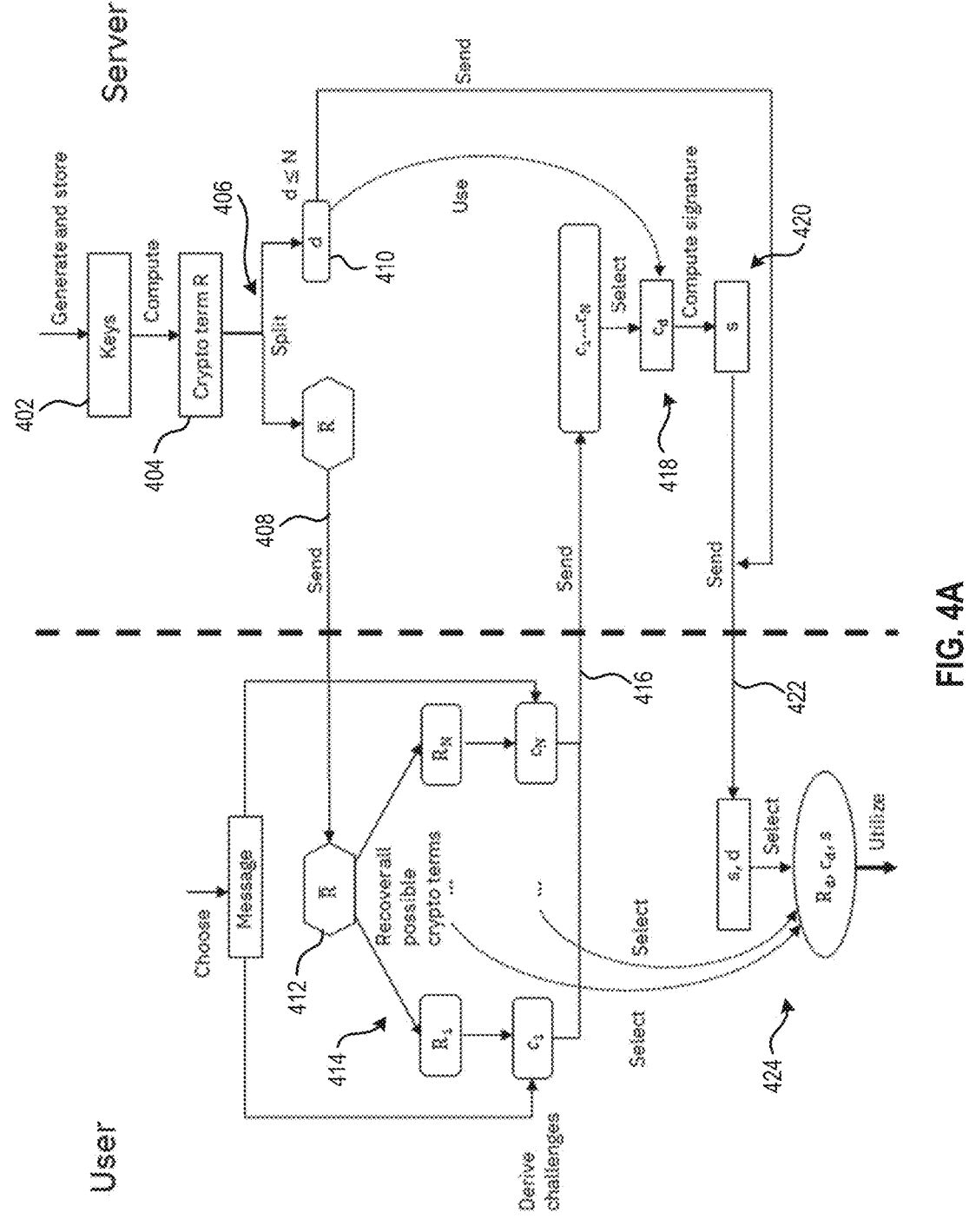
FIG. 4A is a flowchart of a method for improving authenticity of digital signatures, in accordance with an in-use example.

Looking now to FIG. 4A, a flowchart of a computer-implemented method 400 for improving authenticity of digital signatures is illustrated in accordance with an in-use example, which is in no way intended to be limiting. For instance, method 400 is illustrates as being performed over a network connecting a User with a Server. However, the method 400 may be performed in accordance with the present invention in any of the environments depicted in FIGS. 1-3C, among others, in various approaches. More or fewer operations than those specifically described in FIG. 4A may also be included in method 400, e.g., as would be understood by one of skill in the art upon reading the present descriptions. Moreover, each of the operations in method 400 may be performed by any suitable component of the operating environment.

As shown, operation 402 of method 400 includes generating and storing corresponding pairs of cryptographic digital signature keys. Each pair of cryptographic digital signature keys preferably includes a secret key and a corresponding public key. While the public key may be shared over unsecure connections, the private key is kept secure, e.g., at the server.

Proceeding to operation 404, a pair of keys are selected from a queue (e.g., pool), and the selected pair of keys are used to compute first cryptographic term "R". In other words, the selected pair of private and public keys are used in combination to generate a first cryptographic term "R" that cannot be accessed (e.g., utilized) without the same pair of private and public keys. Moreover, operation 406 includes splitting the first cryptographic term R into an initial portion $\overline{R}$, and a remainder portion "d". The initial portion $\overline{R}$ is sent to the User in operation 408, while the remainder portion "d" is maintained at the Server in operation 410. The remainder portion d is preferably smaller than the initial portion $\overline{R}$, however the number of bits that are actually in the remainder portion d may be one or more depending on the approach. For example, the number of bits in the remainder portion d may be determined by a relative importance of data being digitally signed and/or verified.

Looking to User, the received initial portion $\overline{R}$ is evaluated at operation 412 and used to enumerate each potential (e.g., possible) value for the first cryptographic term in operation 414. Accordingly, potential first cryptographic terms $R_1, \ldots, R_N$ are generated. Each of the potential first cryptographic terms $R_1, \ldots, R_N$ are further used to produce corresponding second cryptographic terms $c_1, \ldots, c_N$. The second cryptographic terms $c_1, \ldots, c_N$ may be produced by combining each of the respective potential first cryptographic terms $R_1, \ldots, R_N$ to a chosen message. The message may be "chosen" in the sense that the data therein may be scheduled to be digitally signed and/or verified.

Operation 416 further includes returning the generated second cryptographic terms $c_1, \ldots, c_N$ to the Server. In response to receiving the second cryptographic terms $c_1, \ldots, c_N$, the Server uses the retained remainder portion d to identify the correct one of the second cryptographic terms ca. See operation 418. As noted above, the "correct" term refers to the one of the received potential second cryptographic terms $c_1, \ldots, c_N$ that is produced by the initial portion $\overline{R}$ and the correct guess at the one or more bits that were split from the initial portion $\overline{R}$. Operation 418 may thereby involve the retained remainder portion d to deduce the true (e.g., correct) second cryptographic term "$c_d$". Operation 420 further includes using the true second cryptographic term $c_d$ to compute a third cryptographic term "s".

Proceeding to operation 422, the third cryptographic term s is sent to the User over the network (not shown). The retained remainder portion d is also sent to the User in operation 422. Moreover, operation 424 includes applying the deduced information to the options enumerated in operation 414. As a result, the "correct" first cryptographic term $R_d$, second cryptographic term $c_d$, and known third cryptographic term s, are accessible. Moreover, these cryptographic terms $R_d$, $c_d$, s may be used to digitally sign data, verify a digital signature, decrypt data, etc., e.g., as would be appreciated by one skilled in the art after reading the present description.

Looking further to FIG. 4B, the in-use example illustrated in FIG. 4A has been converted into logical statements and simplified. FIG. 4B shows that delaying the transmission of some information of early protocol value to later stage in the same session overcomes security threats.

As shown, it can be deduced that in all known variations of a given attack, the adversarial choice of $$M^2 = (M_1^2, \dots, M_n^2)$$

crucially depends on the knowledge of all bits of $$M^1 = (M_1^1, \dots, M_n^1).$$

In brief, the server initially sends only partial information about $M^1$, and to disclose the missing information only at a later protocol step. If the amount of initially suppressed information is very small (e.g., one bit), while all known concurrency attacks are already thwarted, the execution of each individual session can continue by considering all possible completions of the compressed $M^1$ to the original $M^1$ separately.

This can also be expressed in technical terms as follows. Let $(\tilde{M}^1, d) \leftarrow \mathrm{Split}(M^1)$ denote splitting the information in $M^1$ into a bulk part $\tilde{M}^1$ and a selector $d \in \{1, \dots, N\}$, where $N$ is a small integer. For example, if $N=2$ then $d$ is effectively 1 bit and $\tilde{M}^1$ is $M^1$ with one bit removed. Let $M^1 \leftarrow \mathrm{Recover}(\tilde{M}^1, d)$ denote undoing this operation. The protocol shown in FIG. 4B may thereby be adapted by letting the server send $\tilde{M}^1$ instead of $M^1$, letting the user enumerate all possible options for selector $d$ to recover $M^1$ from $\tilde{M}^1$ (together with $N-1$ wrong candidates), and continuing the operation with all $N$ candidates in parallel, e.g., as shown.

Even a very small value for $N$ (e.g., $N=2$, which means $\tilde{M}^1$ is one bit shorter than $M^1$) already disables all known attacks against similar protocols. The network overhead is also small, as the number of messages passed is the same and a nominal amount of information (e.g., several bits) is exchanged. In most practical distributed signature schemes the protocol message $M^1$ consists of an element of a discrete-log group. For example, this group may be instantiated with an elliptic curve, in which case $M^1=P=(x, y)$ is just a curve point where coordinate $y$ effectively encodes a single bit. The Split function then coincides with point compression, and Recover coincides with point decompression. As any standard programming library implements these routines anyway, the implementational overhead is minimal.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
in response to receiving a session request from a user, computing a first cryptographic term;
splitting the first cryptographic term into an initial portion and a remainder portion, the remainder portion including at least one bit;
sending the initial portion of the first cryptographic term to the user;
receiving two or more different potential second cryptographic terms from the user;
using the at least one bit in the remainder portion to determine a correct one of the potential second cryptographic terms;
using the correct one of the potentials second cryptographic terms to compute a third cryptographic term; and
sending the third cryptographic term to the user.

2. The CIM of claim 1, further comprising:
sending the at least one bit in the remainder portion to the user,
wherein combining the at least one bit in the remainder portion and the initial portion of the first cryptographic term produces: the first cryptographic term, and the correct one of the potentials second cryptographic terms.

3. The CIM of claim 1, wherein the session request is received at a server from the user, wherein the computing of the first cryptographic term includes:
using one of a number of cryptographic signature keys that are stored at the server.

4. The CIM of claim 1, wherein the remainder portion includes one bit, wherein two different potentials second cryptographic terms are received from the user.

5. The CIM of claim 1, wherein the remainder portion includes two bits, wherein four different potentials second cryptographic terms are received from the user.

6. The CIM of claim 1, wherein the splitting of the first cryptographic term includes:
compressing an elliptical curve point that corresponds to the first cryptographic term.

7. The CIM of claim 1, wherein the splitting of the first cryptographic term in a discrete logarithm setting includes:
dropping a least significant bit from the first cryptographic term.

8. A computer program product (CPP), comprising:
a set of one or more non-transitory computer-readable storage media; and
program instructions, collectively stored in the set of one or more non-transitory computer readable storage media, or causing a processor set to perform the following computer operations:
in response to receiving a session request from a user, compute a first cryptographic term;
split the first cryptographic term into an initial portion and a remainder portion, the remainder portion including at least one bit;
send the initial portion of the first cryptographic term to the user;
receive two or more different potential second cryptographic terms from the user;
use the at least one bit in the remainder portion to determine a correct one of the potential second cryptographic terms;
use the correct one of the potentials second cryptographic terms to compute a third cryptographic term; and
send the third cryptographic term to the user.

9. The CPP of claim 8, wherein the program instructions are for causing the processor set to further perform the following computer operations:

send the at least one bit in the remainder portion to the user, wherein combining the at least one bit in the remainder portion and the initial portion of the first cryptographic term produces: the first cryptographic term, and the correct one of the potentials second cryptographic terms.

10. The CPP of claim 8, wherein the session request is received at a server from the user, wherein the computing of the first cryptographic term includes:

using one of a number of cryptographic signature keys that are stored at the server.

11. The CPP of claim 8, wherein the remainder portion includes one bit, wherein two different potentials second cryptographic terms are received from the user.

12. The CPP of claim 8, wherein the remainder portion includes two bits, wherein four different potentials second cryptographic terms are received from the user.

13. The CPP of claim 8, wherein the splitting of the first cryptographic term includes:

compressing an elliptical curve point that corresponds to the first cryptographic term.

14. The CPP of claim 8, wherein the splitting of the first cryptographic term in a discrete logarithm setting includes:

dropping a least significant bit from the first cryptographic term.

15. A computer system (CS), comprising:

a processor set;

a set of one or more non-transitory computer-readable storage media;

program instructions, collectively stored in the set of one or more non-transitory computer readable storage media, for causing the processor set to perform the following computer operations:

in response to receiving a session request from a user, compute a first cryptographic term;

split the first cryptographic term into an initial portion and a remainder portion, the remainder portion including at least one bit;

send the initial portion of the first cryptographic term to the user;

receive two or more different potentials second cryptographic terms from the user;

use the at least one bit in the remainder portion to determine a correct one of the potentials second cryptographic terms;

use the correct one of the potentials second cryptographic terms to compute a third cryptographic term; and send the third cryptographic term to the user.

16. The CS of claim 15, wherein the program instructions are for causing the processor set to further perform the following computer operations:

send the at least one bit in the remainder portion to the user, wherein combining the at least one bit in the remainder portion and the initial portion of the first cryptographic term produces: the first cryptographic term, and the correct one of the potentials second cryptographic terms.

17. The CS of claim 15, wherein the session request is received at a server from the user, wherein the computing of the first cryptographic term includes:

using one of a number of cryptographic signature keys that are stored at the server.

18. The CS of claim 15, wherein the remainder portion includes one bit, wherein two different potentials second cryptographic terms are received from the user.

19. The CS of claim 15, wherein the remainder portion includes two bits, wherein four different potentials second cryptographic terms are received from the user.

20. A computer-implemented method (CIM), comprising:

receiving, from a server, an initial portion of a first cryptographic term;

identifying a remainder portion of the first cryptographic term that is missing;

enumerating potential values for the missing remainder portion of the first cryptographic term;

developing potential second cryptographic terms for the respective potential values enumerated for the missing remainder portion;

sending the potential second cryptographic terms to the server;

receiving a third cryptographic term from the server;

receiving the missing remainder portion of the first cryptographic term; and producing the first cryptographic term by combining the remainder portion of the first cryptographic term and the initial portion of the first cryptographic term.

21. The CIM of claim 20, further comprising:

accessing a cryptographic signature using: the third cryptographic term, the first cryptographic term, and a correct one of the potentials second cryptographic terms.

22. A computer program product (CPP), comprising:

a set of one or more non-transitory computer-readable storage media; and program instructions, collectively stored in the set of one or more non-transitory computer readable storage media, for causing a processor set to perform the following computer operations:

receive, from a server, an initial portion of a first cryptographic term;

identify a remainder portion of the first cryptographic term that is missing;

enumerate potential values for the missing remainder portion of the first cryptographic term;

develop potential second cryptographic terms for the respective potential values enumerated for the missing remainder portion;

send the potential second cryptographic terms to the server;

receive a third cryptographic term from the server;

receive the missing remainder portion of the first cryptographic term; and produce the first cryptographic term by combining the remainder portion of the first cryptographic term and the initial portion of the first cryptographic term.

23. The CPP of claim 22, wherein the program instructions are for causing the processor set to further perform the following computer operations:

access a cryptographic signature using: the third cryptographic term, the first cryptographic term, and a correct one of the potentials second cryptographic terms.

* * * * *